US007330805B2

(12) United States Patent
Iimori

(10) Patent No.: US 7,330,805 B2
(45) Date of Patent: Feb. 12, 2008

(54) METHOD FOR PREDICTING BENDING DURABILITY OF ELECTRIC WIRE AND BEND PROTECTION MEMBER, AND APPARATUS AND RECORDING MEDIUM STORING PROGRAM THEREFOR

(75) Inventor: Yasuo Iimori, Kosai (JP)

(73) Assignee: Yazaki Corporation, Tokyo (JP)

( * ) Notice: Subject to any disclaimer, the term of this patent is extended or adjusted under 35 U.S.C. 154(b) by 128 days.

(21) Appl. No.: 10/536,752

(22) PCT Filed: Nov. 26, 2003

(86) PCT No.: PCT/JP03/15103

§ 371 (c)(1),
(2), (4) Date: Nov. 28, 2005

(87) PCT Pub. No.: WO2004/048939

PCT Pub. Date: Jun. 10, 2004

(65) Prior Publication Data

US 2006/0155416 A1    Jul. 13, 2006

(30) Foreign Application Priority Data

Nov. 28, 2002  (JP)  ............................. 2002-345219
Oct. 24, 2003  (JP)  ............................. 2003-364519

(51) Int. Cl.
G06F 17/50 (2006.01)
G01N 3/00 (2006.01)

(52) U.S. Cl. ................. 703/2; 703/7; 702/42; 700/146; 700/182

(58) Field of Classification Search ............. 703/2, 703/7; 700/146, 182; 702/42
See application file for complete search history.

(56) References Cited

U.S. PATENT DOCUMENTS 5,291,419 A  3/1994  Satoh et al.

(Continued)

FOREIGN PATENT DOCUMENTS

| EP | 1 130 527 | 9/2001 |
| EP | 1 236 989 A2 | 9/2002 |
| JP | 2002-260460 | 9/2002 |
| JP | 2002-260460 A | 9/2002 |

OTHER PUBLICATIONS

Paul A. Schmidt, et al., "Development of a Novel Specimen Geometry for Fatigue Testing of Fine Wire", Journal of Testing and Evaluation, Mar. 1995, No. 2, pp. 73-79.

(Continued)

Primary Examiner—Thai Phan
(74) Attorney, Agent, or Firm—Sughrue Mion, PLLC

(57) ABSTRACT

A wires laid at a predetermined bend, a bend protection member, an atmosphere temperature and the initial shape and the final bent shape of the wires and the bend protection member are designated, and infinite element models are prepared for the wires and the bend protection member. Then, stresses caused during the bending and the movement from the initial shapes to the final bent shapes are calculated for the individual infinite elements, and the maximum stresses imposed on the wires and the bend protection member are searched for among the stresses that are obtained. Then, the number of bendings for endurance, in consonance with necessary prediction functions, are obtained and the maximum stresses imposed on the wires and the bend protection member. By referring to the number of bendings for endurance, the smallest number of bendings for endurance is acquired and output.

19 Claims, 8 Drawing Sheets

U.S. PATENT DOCUMENTS

| | | | | |
|---|---|---|---|---|
| 5,390,127 | A | * | 2/1995 | Tang et al. ................. 700/146 |
| 6,374,022 | B1 | * | 4/2002 | Parmigiani et al. ......... 385/100 |
| 6,839,642 | B2 | * | 1/2005 | Kawakita et al. ............. 702/42 |
| 2002/0139194 | A1 | | 10/2002 | Mars |
| 2002/0183993 | A1 | * | 12/2002 | Hirata ........................... 703/2 |
| 2006/0052990 | A1 | * | 3/2006 | Iimori ........................... 703/7 |
| 2006/0167582 | A1 | * | 7/2006 | Jayko ........................ 700/182 |

OTHER PUBLICATIONS

Korean Office Action dated Aug. 23, 2006.

B. Nath, "Matrix Infinite Element Method", Brain Book Publishing Co., Ltd., Aug. 10, 1978, 8 pages.

Nobuyoshi Tosaka, "Numerical Simulation Using Partial Differential Equation", Tokyo University Publisher, First Edition, Apr. 1, 1991, 4 pages.

* cited by examiner

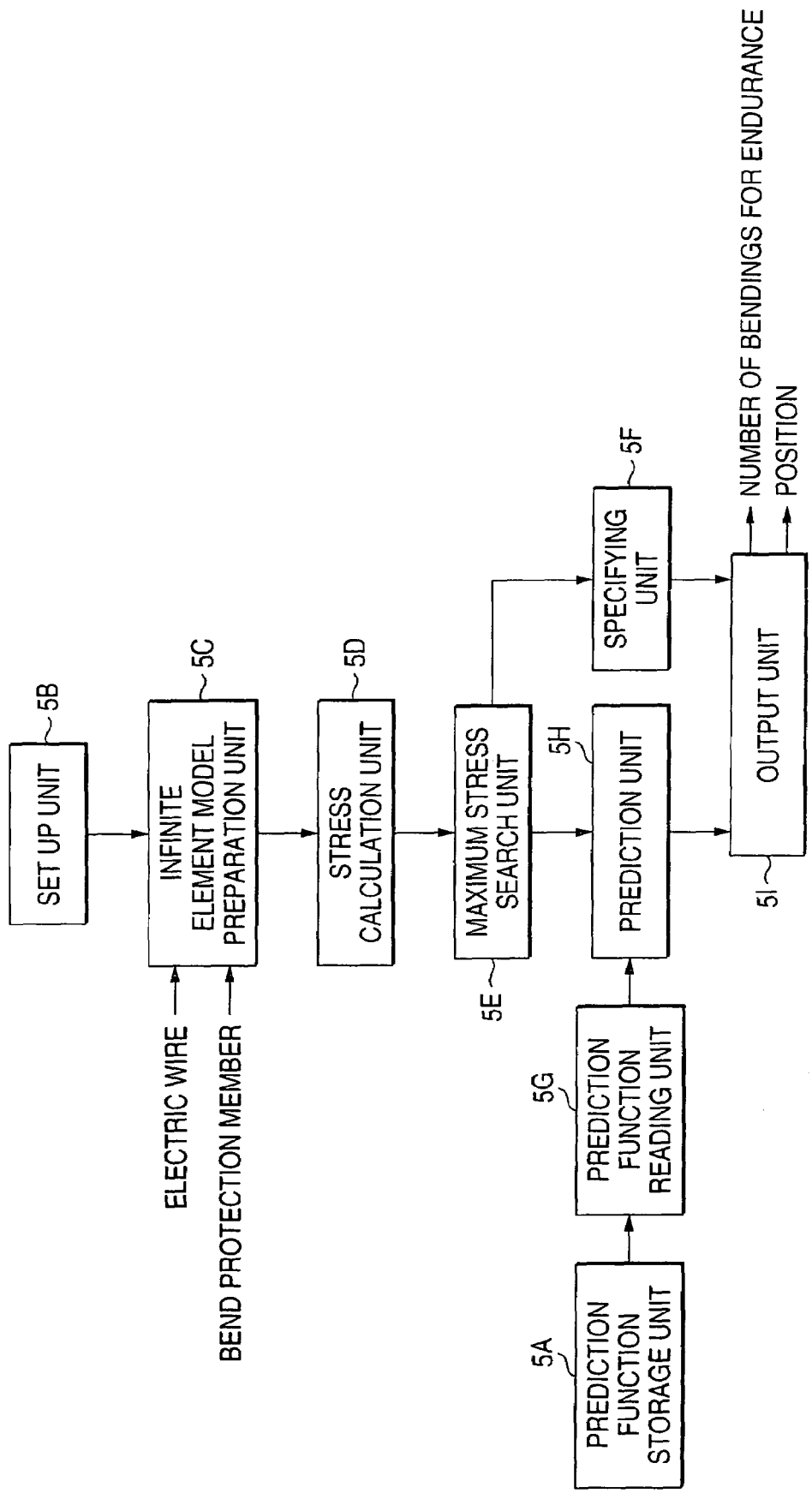

METHOD FOR PREDICTING BENDING DURABILITY OF ELECTRIC WIRE AND BEND PROTECTION MEMBER, AND APPARATUS AND RECORDING MEDIUM STORING PROGRAM THEREFOR

TECHNICAL FIELD

The present invention relates to a method for predicting the durability, at a predetermined bend, of a plurality of electric wires laid at the bend and a bend protection member provided thereat to protect the electric wires, and an apparatus and a recording medium storing program therefor.

BACKGROUND ART

Electric wires are provided in vehicles for portions, such as doors that are opened and closed and sliding seats, whereat they are forcefully bent. For example, a plurality of electric wires, which serve as electrical connectors between doors and other automobile body parts, are extended between the doors and the body and pass through bend protection members, called grommets, that are fixed to the hinges by which the doors are installed on the body.

Since grommets and electric wires are bent repeatedly, whenever automobile doors are opened and closed or sliding seats are moved, the ability to predict the durability or the product life of grommets and wires and how well they can withstand the effects produced by bending is important. Conventionally, design, test manufacturing and actual bending tests are repeatedly performed to provide a basis for predicting the durability of grommets and electric wires and how well they will resist the effects produced by bending. On the other hand, since the trend is for the development period for an automobile to be constantly reduced, improvement in prediction accuracy is sought. Thus, as in patent document 1, methods have been proposed whereby test manufacturing can be eliminated and bending durability predicted by performing computer simulations.

Patent Document 1
  JP-A-2002-260460

Non-Patent Document 1
  "Matrix Infinite Element Method", B. Nass, Brain Book Publishing Co., Ltd., Aug. 10, 1978, pp. 7-5

Non-Patent Document 2
  "Numerical Simulation Using Partial Differential Equation", Nobuyoshi Tosaka, Tokyo University Publisher, First Edition, Apr. 1, 1991, pp. 119-123

According to the bending durability prediction method in patent document 1, a plurality of electric wires inserted through a grommet are regarded as a wire bundle model, and based on this model, the product life of the wire bundle is predicted. However, since several types and a multiplicity of wires are inserted through a grommet, when the method in patent document 1 is used it is difficult to accurately identify which portion of a wire is damaged first. Further, according to the method in patent document 1, although a set consisting of a plurality of electric wires and a grommet are always employed at a bend, only the product life of the wire bundle is predicted. Therefore, another method is required that can predict the overall product life, including the product lives of the individual electric wires and the grommet. In other words, an improvement is required that can cope with requests for shortening the development period and for improving the prediction accuracy.

DISCLOSURE OF INVENTION

To resolve these shortcomings, it is one objective of the present invention to provide a bending durability prediction method that can cope with requests for more accurate product life prediction and a reduction in the development period, and an apparatus and a program therefor.

In order to solve the aforesaid object, the invention is characterized by having the following arrangement.

(1) A bending durability prediction method of predicting a bending durability of a plurality of wires laid at a predetermined bend, and of a bend protection member attached at the bend to protect the plurality of wires by using an infinite element method, the bending durability prediction method comprising:
  a setup step of setting up the plurality of wires, the bend protection member, an atmosphere temperature, pre-bending initial shapes for the wires and the bend protection member and final bent shapes for the wires and the bend protection member;
  an infinite element model preparation step of preparing infinite element models for the plurality of wires and the bend protection member;
  a stress calculation step of calculating stress, for each of infinite elements of the infinite element models, produced by bending the infinite elements from the initial shape to the final bent shape;
  a maximum stress search step of searching, among the stresses obtained at the stress calculation step, for the maximum stress for each of the plurality of wires and the bend protection member;
  a prediction function acquisition step of obtaining prediction functions for the wires, the bend protection member and the atmosphere temperature designated at the setup step;
  a predicting step of referring to the prediction functions obtained at the prediction function acquisition step, obtaining numbers of bendings for endurance which correspond to the maximum stresses for the wires and the bend protection member, and identifying the smallest number of bendings for endurance; and
  an output step of outputting the smallest number of bendings obtained at the predicting step.

(2) The bending durability prediction method according to (1) further comprising:
  a specifying step of specifying a position on the wires or the bend protection member corresponding to the smallest number of bendings for endurance,
  wherein the position specified at the specifying step is output at the output step.

(3) The bending durability prediction method according to (1), wherein as the prediction function, a curve is employed that represents a lower confidence interval relative to a modular regression function that is statistically obtained based on data on the stresses and the number of bendings for endurance which are acquired under a plurality of typical atmosphere temperatures.

(4) The bend durability prediction method according to (1), further comprising:
  a wire arrangement step of arranging, innermost at the bend, a thickest wire of all the plurality of wires.

(5) The bend durability prediction method according to (1), further comprising:
  a storing step of previously storing stress tables which represent minimum stresses according to which it is assumed that the plurality of wires and the bend protection member will be damaged;

a stress table reading step of reading stress tables corresponding to the plurality of wires, the bend protection member and the atmosphere temperature designated in the setup step; and a damaged member specifying step of specifying the wire or the bend protection member that is first damaged, while referring to the stress tables that are read at the stress table reading step and the individual maximum stresses that are found at the maximum stress search step for the wires and the bend protection member, the output step outputs information specifying the wire or the bend protection member that is first damaged.

(6) A bending durability prediction method of predicting a bending durability of a plurality of wires laid at a predetermined bend, and of a bend protection member attached at the bend to protect the plurality of wires by using an infinite element method, the bending durability prediction method comprising:

a storing step of previously storing stress tables which represent minimum stresses according to which it is assumed that the plurality of wires and the bend protection member will be damaged;

a setup step of setting up the plurality of wires, the bend protection member, an atmosphere temperature, pre-bending initial shapes for the wires and the bend protection member and final bent shapes for the wires and the bend protection member;

an infinite element model preparation step of preparing infinite element models for the plurality of wires and the bend protection member;

a stress calculation step of calculating stress, for each of infinite elements of the infinite element models, produced by bending the infinite elements from the initial shape to the final bent shape;

a maximum stress search step of searching, among the stresses obtained at the stress calculation step, for the maximum stress for each of the plurality of wires and the bend protection member;

a stress table reading step of reading stress tables corresponding to the plurality of wires, the bend protection member and the atmosphere temperature designated in the setup step;

a damaged member specifying step of specifying the wire or the bend protection member that is first damaged, while referring to the stress tables that are read at the stress table reading step and the individual maximum stresses that are found at the maximum stress search step for the wires and the bend protection member; and an output step of outputting information specifying the wire or the bend protection member that is first damaged.

(7) The bend durability prediction method according to (6), further comprising:

a wire arrangement step of arranging, innermost at the bend, a thickest wire of all the plurality of wires.

(8) A bending durability prediction apparatus for predicting a bending durability of a plurality of wires laid at a predetermined bend, and of a bend protection member attached at the bend to protect the plurality of wires by using an infinite element method, the apparatus comprising:

a setup unit for setting up the plurality of wires, the bend protection member, an atmosphere temperature, pre-bending initial shapes for the wires and the bend protection member and final bent shapes for the wires and the bend protection member;

an infinite element model preparation unit for preparing infinite element models for the plurality of wires and the bend protection member;

a stress calculation unit for calculating stress, for each of infinite elements of the infinite element models, produced by bending the infinite elements from the initial shape to the final bent shape;

a maximum stress search unit for searching, among the stresses obtained by the stress calculation unit, for the maximum stress for each of the plurality of wires and the bend protection member;

a prediction function acquisition unit for obtaining prediction functions for the wires, the bend protection member and the atmosphere temperature designated by the setup unit;

a predicting unit for referring to the prediction functions obtained by the prediction function acquisition unit, obtaining numbers of bendings for endurance which correspond to the maximum stresses for the wires and the bend protection member, and identifying the smallest number of bendings for endurance; and an output unit for outputting the smallest number of bendings obtained by the predicting unit.

(9) A computer readable recording medium storing a program for predicting a bending durability of a plurality of wires laid at a predetermined bend, and of a bend protection member attached at the bend to protect the plurality of wires by using an infinite element method, the program causing a computer to function as:

a setup unit for setting up the plurality of wires, the bend protection member, an atmosphere temperature, pre-bending initial shapes for the wires and the bend protection member and final bent shapes for the wires and the bend protection member;

an infinite element model preparation unit for preparing infinite element models for the plurality of wires and the bend protection member;

a stress calculation unit for calculating stress, for each of infinite elements of the infinite element models, produced by bending the infinite elements from the initial shape to the final bent shape;

a maximum stress search unit for searching, among the stresses obtained by the stress calculation unit, for the maximum stress for each of the plurality of wires and the bend protection member;

a prediction function acquisition unit for obtaining prediction functions for the wires, the bend protection member and the atmosphere temperature designated by the setup unit;

a predicting unit for referring to the prediction functions obtained by the prediction function acquisition unit, obtaining numbers of bendings for endurance which correspond to the maximum stresses for the wires and the bend protection member, and identifying the smallest number of bendings for endurance; and an output unit for outputting the smallest number of bendings obtained by the predicting unit.

BRIEF DESCRIPTION OF DRAWINGS

FIG. 1 is a block diagram showing the basic configuration of the present invention.

BEST MODE FOR CARRYING OUT THE INVENTION

The preferred embodiments of the present invention will now be described while referring to the accompanying drawings.

Figure 2A:
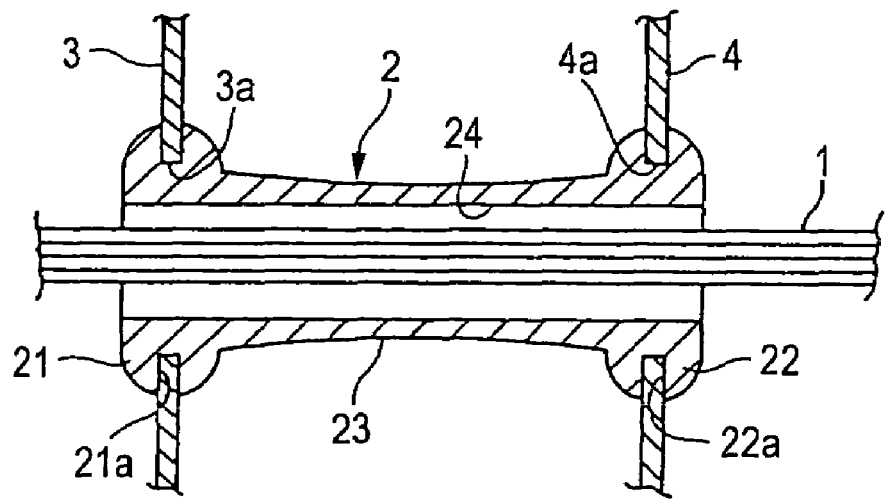
FIGS. 2A and 2B are diagrams showing the states of electric wires and a bend protection member when the door of a vehicle is closed and when the door is open.
Figure 2B:
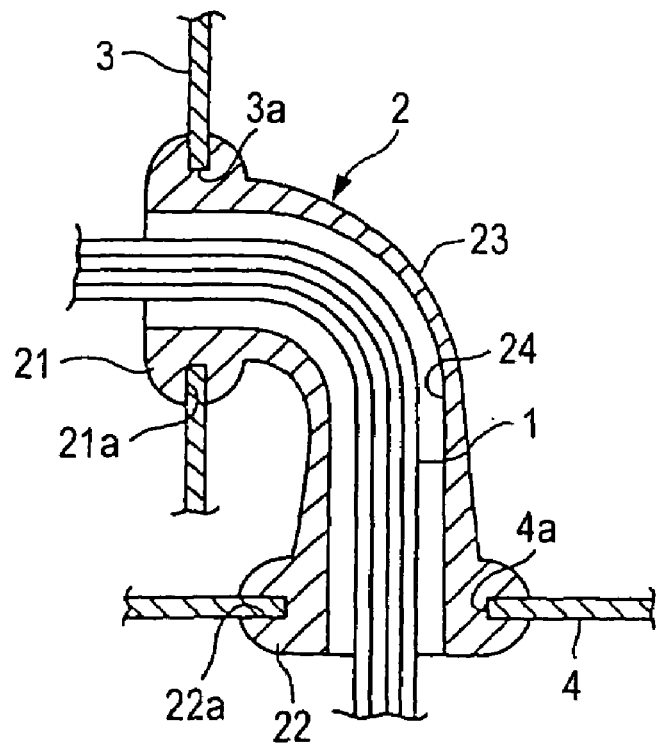

FIGS. 2A and 2B are diagrams showing the states of electric wires and a bend protection member when the door of a vehicle is closed and when the door is open. As shown in FIG. 2A, a grommet 2 through which a plurality of electric wires 1 are inserted is attached between a body panel 3 and a door panel 4. As is well known, the electric wires 1 are formed by using an inner insulating cover or an outer insulating cover to protect predetermined core wires. As is also well known, the grommet 2 is made of a cylindrical flexible material, and includes: fixed portions 21 and 22, which are secured to wire lead ports 3a and 4a in the body panel 3 and the door panel 4; and a cylindrical portion 23, which connects these fixed portions 21 and 23 and within which a wire through hole 24 is formed into which a plurality of electric wires are to be inserted.

The diameters of the fixed portions 21 and 22 are larger than the diameter of the cylindrical portion 23, and ring grooves 21a and 21b are formed along the outer circumferences of the fixed portions 21 and 22. The wire lead ports 3a and 4a are respectively fitted into the ring grooves 21a and 21b, mounting the grommet 2 at a predetermined position. Further, although not shown in FIGS. 2A and 2B, the surface of the cylindrical portion 23 is shaped like a bellows to prevent the cylindrical portion 23 from being sharply bent when the door is closed or open.

As shown in FIG. 2A, when the door is open, the body panel 3 and the door panel 4 are parallel to each other, and the cylindrical portion 23 is also nearly parallel. Accordingly, the electric wires 2 are held in a linearly extended state. Conversely, as shown in FIG. 2B, when the door is closed, the body panel 3 and the door panel 4 form a substantially 90 degree angle, and the cylindrical portion 23 is bent. Accordingly, the electric wires 1 are bent.

As described above, while the electric wires 1 and the grommet 2 are repetitively bent as the door is opened and closed, the damage may occur, such as the snapping of the electric wires 1 or cracking on the grommet 2. Therefore, according to the present invention, the smallest durable number of bending defined by a number of bending when at least one of the electric wires 1 or the grommet 2 is damaged, i.e., the bend durability is predicted. Alternatively, the electric wire 1 or the grommet 2 that is first damaged is predicted. It should be noted that the grommet 2 corresponds to the bend protection member cited in the claims, and the portion between the body panel 3 and the door panel 4 corresponds to the bend cited in the claims. However, the shape of the grommet 2 is not limited to the one described above.

In this invention, the infinite element method is employed to predict the number of bendings for endurance, or the member that is first damaged. As is well known, the infinite element method employs a computer to obtain the distribution of continual stresses for a complex structure. According to the infinite element method, a structure to be analyzed is divided into infinite elements having triangular mesh shapes or rectangular mesh shapes, and a fundamental differential equation is established for each infinite element, while a pair of simultaneous linear equations is established so that the solution of each infinite element satisfies the continuity with the solution of an adjacent infinite element. By solving these equations, the stresses are obtained for the individual infinite elements, which are defined as unknown quantities. Since the infinite element method is also described in non-patent documents 1 and 2, no further explanation for this will be given.

Figure 3A:
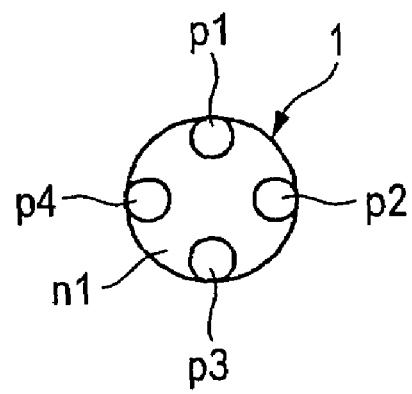
FIGS. 3A and 3B are diagrams showing the allocation of infinite elements for an electric wire and a grommet, and stress calculation points.
Figure 3B:
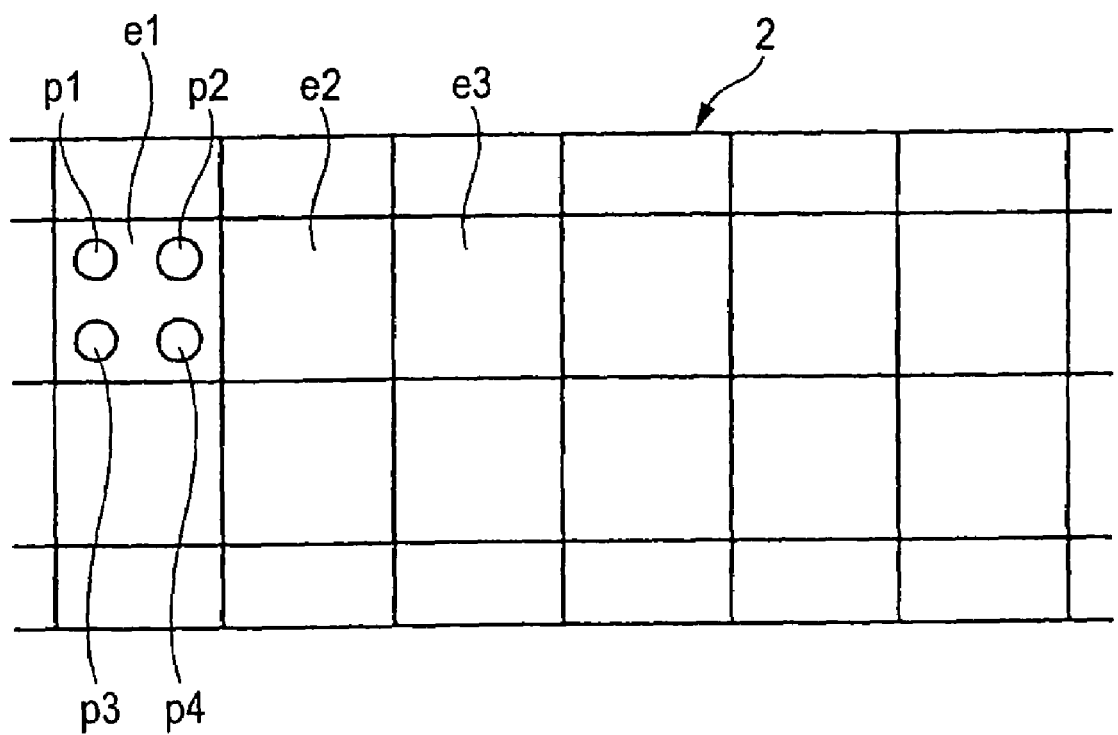

FIGS. 3A and 3B are diagrams that respectively show the allocation of the infinite elements and the stress computation points relative to the electric wires 1 and the grommet 2. According to this invention, a three-dimensional beam element is employed as a model for the electric wire 1, and as shown in FIG. 3A, the stress is calculated at four points p1 to p4 in the cross sections that match a node n1 of the beam element. A method similar to the method disclosed in Japanese Patent Application No. 2002-279502, filed by the present inventor on Sep. 25, 2002, can be employed to turn each electric wire into a model of a three-dimensional beam element. As for the grommet 2, as shown in FIG. 3b, the model of the grommet 2 is divided into a plurality of rectangular infinite elements e1, e2, e3, . . . , and the stress is calculated at four points p1 to p4 for each infinite element e.

Figure 4:
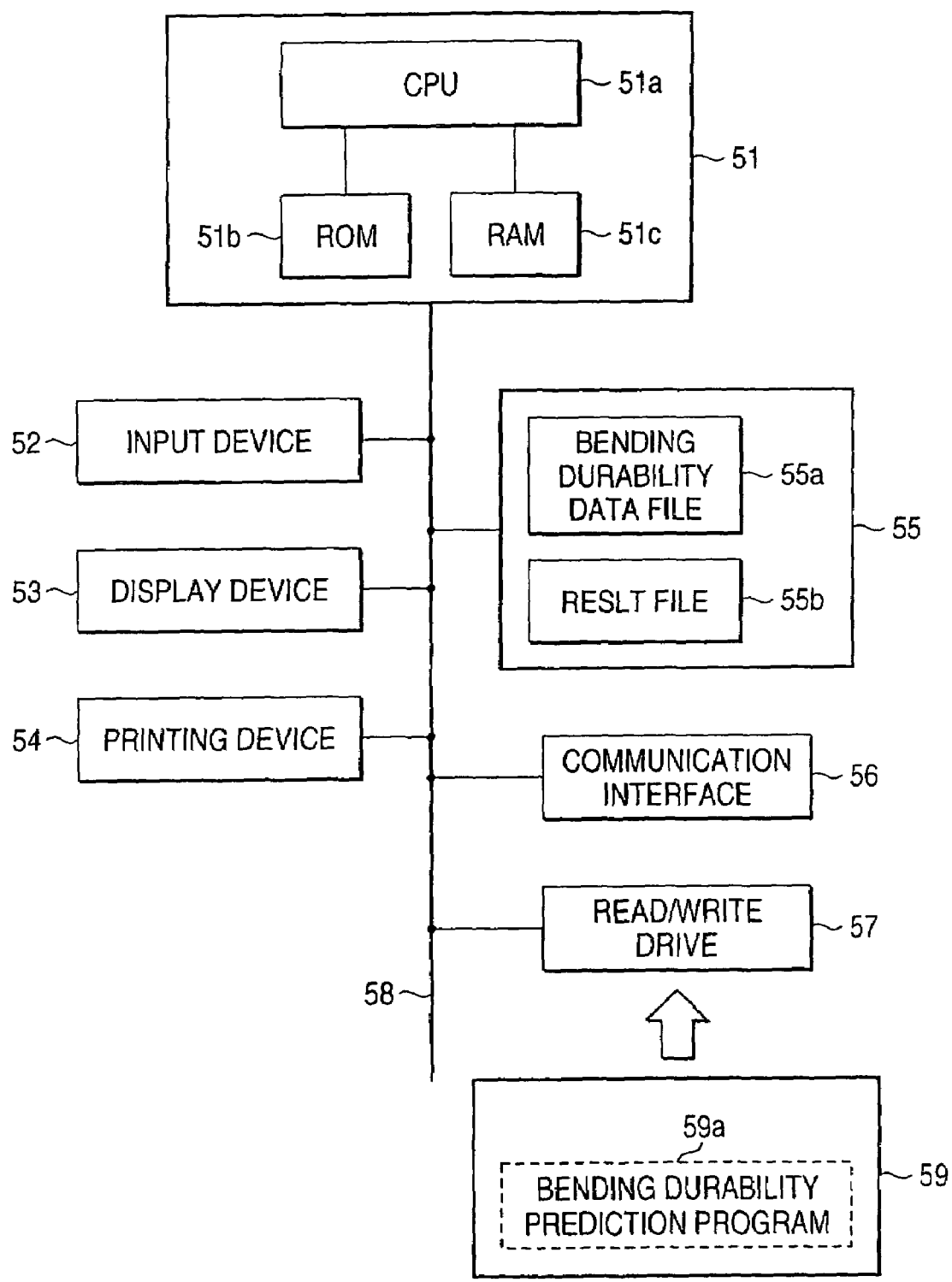
FIG. 4 is a block diagram showing the hardware configuration according to one embodiment of the invention.
Figure 5A:
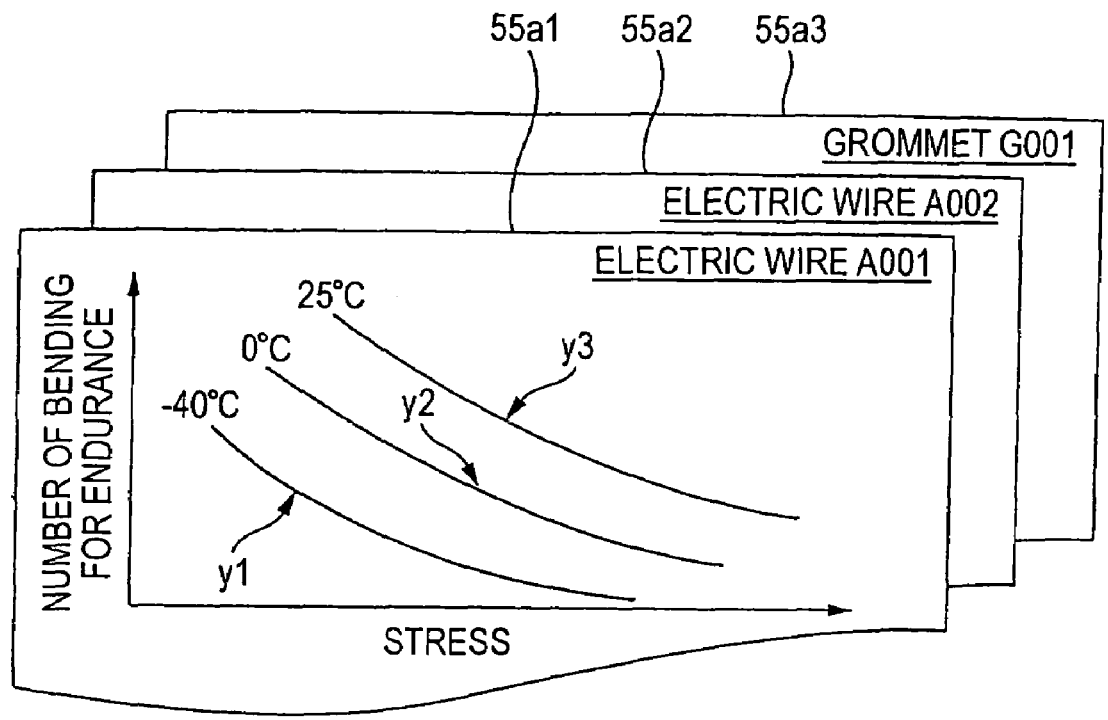
FIGS. 5A and 5b are graphs related to a product life data file stored in a storage device in FIG. 4.
Figure 5B:
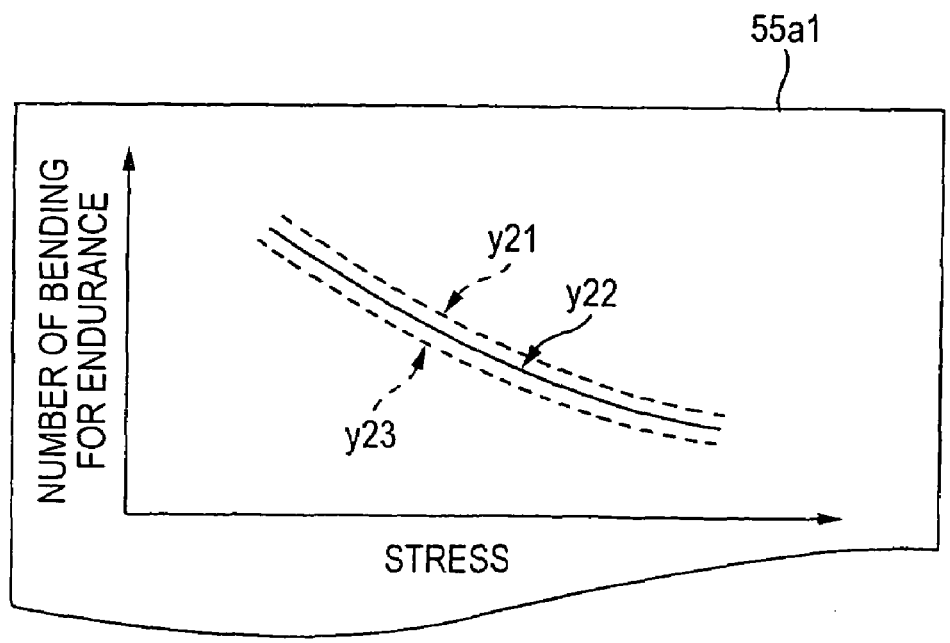

An explanation will now be given for the hardware configuration that performs the processing according to the embodiment of the invention. FIG. 4 is a block diagram showing the hardware configuration according to the embodiment, and FIGS. 5A and 5B are graphs showing product life data files stored in a storage device in FIG. 4.

As shown in FIG. 4, for this invention an apparatus, such as a personal computer, is employed that basically comprises: a microcomputer 51, an input device 52, a display device 53, the printing device 54, a storage device 55, a communication interface 56 and a read/write drive 57. The microcomputer 51 includes a CPU (Central Processing Unit) 51a, a ROM 51b for storing a boot program, and a RAM 51c for temporarily storing various processing results. The input device 52 can be a keyboard or a mouse used to enter various values; the display device 52 can be an LCD or a CRT used to display the processing results; and the printing device 54 is a printer used for printing the processing results.

The storage device 55 can be a hard disk drive, and the communication interface 56 can be a modem board for performing data communication with an external device across the Internet or a LAN. The read/write drive 57 is a device for reading a bend durability prediction program 59a that is related to the present invention and is stored on a recording medium 59, such as a CD or a DVD, or for writing a result file 55b to the recording medium 59. These components are interconnected by an internal bus 58.

At least, a bend durability data file 55a and the result file 55b are stored in the storage device 55. As shown in FIG.

5A, the bend durability data file 55a is an aggregate of prediction functions y1, y2 and y3, which are statistically calculated based on data for the stresses and the numbers of bendings that are durable for electric wires 55a1 and 55a2 and a grommet 55a3 that have been acquired at a plurality of typical atmosphere temperatures, such as −40° C., 0° C. and 25° C. More specifically, in these graphs, the stress along the horizontal axis is zero, or a predetermined reference value, when the electric wires and the grommet have their initial shapes. In other words, the stress along the horizontal axis may be regarded as the degree of change in the stress, while the initial shape is used as a reference.

Preferably, as the prediction function, as shown in FIG. 5B, a curve 23 is employed, while a curve y22 represents the upper confidence interval relative to a modular regression function y21 obtained through a well known regression analysis, and the curve y23 represents the lower confidence interval. In this embodiment, the confidence interval is 95%, and this prediction function is obtained in advance at each atmosphere temperature for each of the electric wires 55a1 and 55a2 and the grommet 55a3. Therefore, the product life prediction is performed under a statistically stricter condition. Naturally, predetermined statistical confidence can be maintained for the prediction functions, and computing the prediction functions is simple. As a result, the bend durability prediction can be more strictly performed without complicated procedures being added, and a greater improvement in the quality and the proposal of a better path can be expected. It should be noted that the modular regression function may be employed to obtain the durable number of bending.

Or, although not shown, the bending durability file 55a may be, instead of a set of the prediction functions, a set of stress tables that represent the minimum stresses according to which it is assumed that the electric wires 55a1 and 55a2 and the grommet 55a3 will be damaged. The stress tables are also obtained in advance for a plurality of typical atmosphere temperatures.

In the result file 55b, all the stresses obtained at the four points of each of the infinite elements of the electric wires 55a1 and 55a2 and the grommet 55a3 are recorded for every predetermined step width. The result file 55b can be stored in a text form, and can be output as needed. It should be noted that the storage device 55 corresponds to the prediction function storage unit cited in the claims.

With this configuration, the microcomputer 51 installs in the storage device 55 the bending durability prediction program 59a, which is read by the read/write drive 57. Furthermore, when the power is on, the microcomputer 51 is activated in accordance with the boot program stored in the ROM 51b, and begins the bending durability program 59a. Then, in accordance with this bending durability program 59a, the microcomputer 51 predicts the bending durabilities of the electric wires and the bend protection member that is attached to the bend to protect the electric wires, displays the obtained durabilities on the display device 53, or prints them using the printing device 54, and stores these results in the storage device 55. The bending durability prediction program 59a can also be installed in another personal computer having the same basic configuration, and after the program is installed, the computer functions as a bending, durable life prediction apparatus. It should be noted that the bending durability prediction program 59a stored in the recording medium 59 corresponds to claim 8. The bending durability prediction program 59a may be provided not only by the recording medium 59, but also across a communication line such as the Internet and a LAN.

Figure 6:
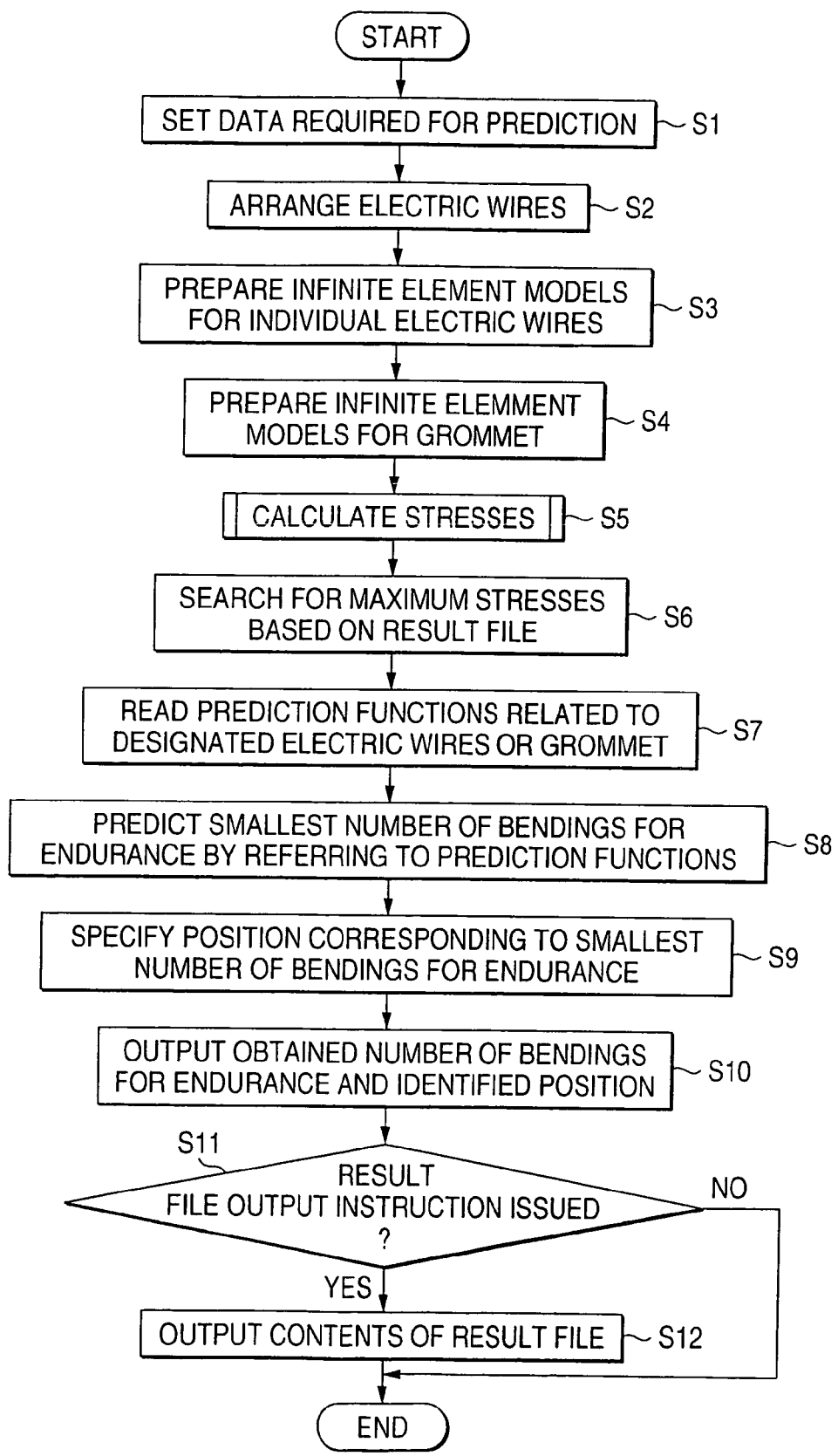
FIG. 6 is a flowchart showing the main processing according to the embodiment of the invention.
Figure 7:
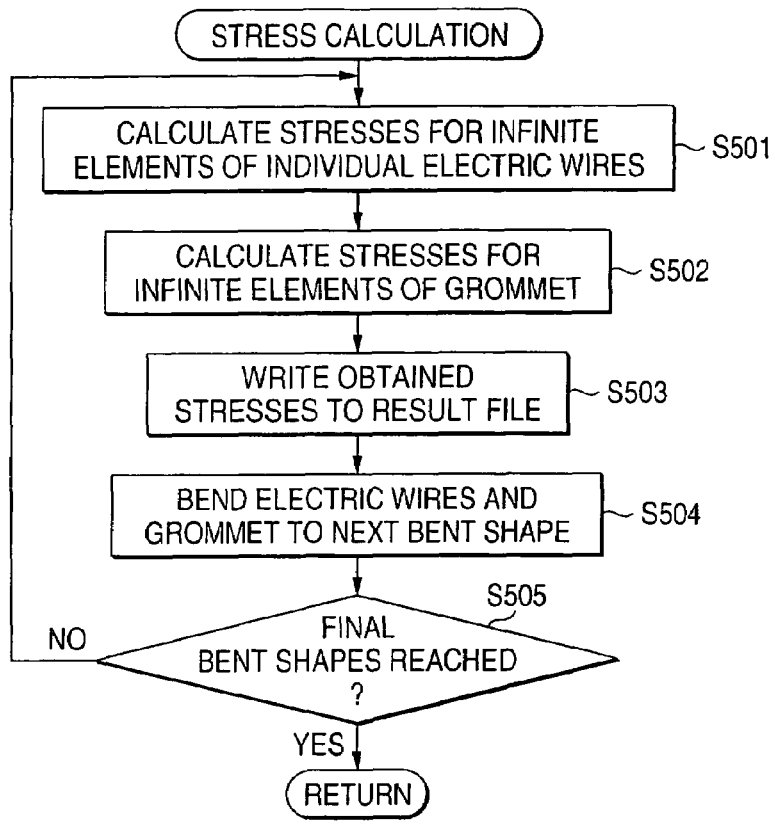
FIG. 7 is a flowchart showing the stress calculation processing in FIG. 6.
Figure 8:
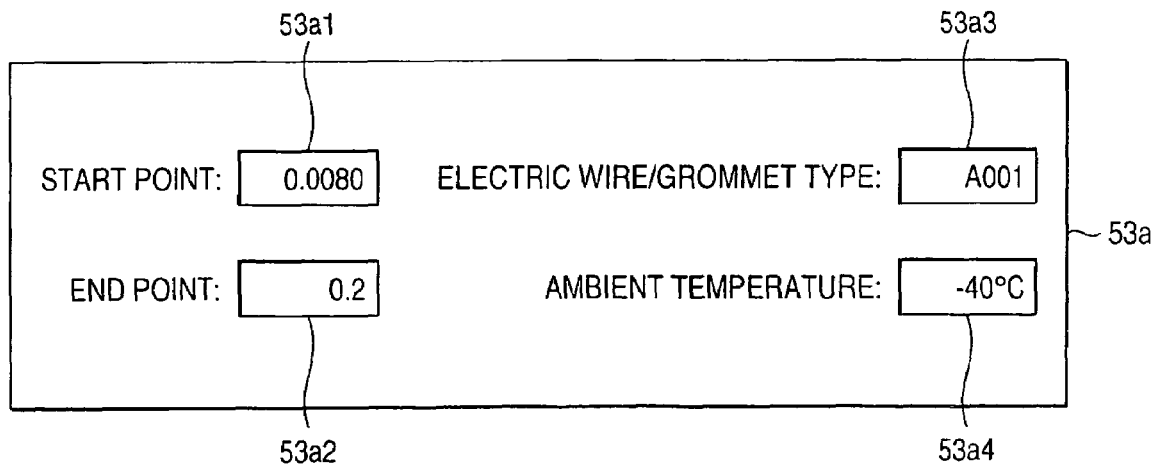
FIG. 8 is a diagram showing an input screen according to the embodiment of the invention.
Figure 9:
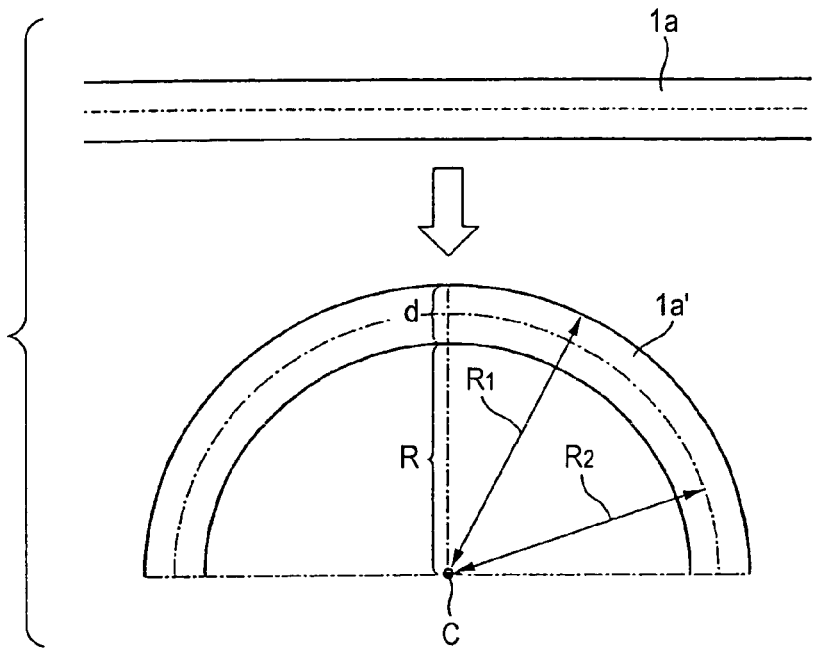
FIG. 9 is a diagram for explaining the relationship between the diameter of an electric wire and a specific stress.
Figure 10:
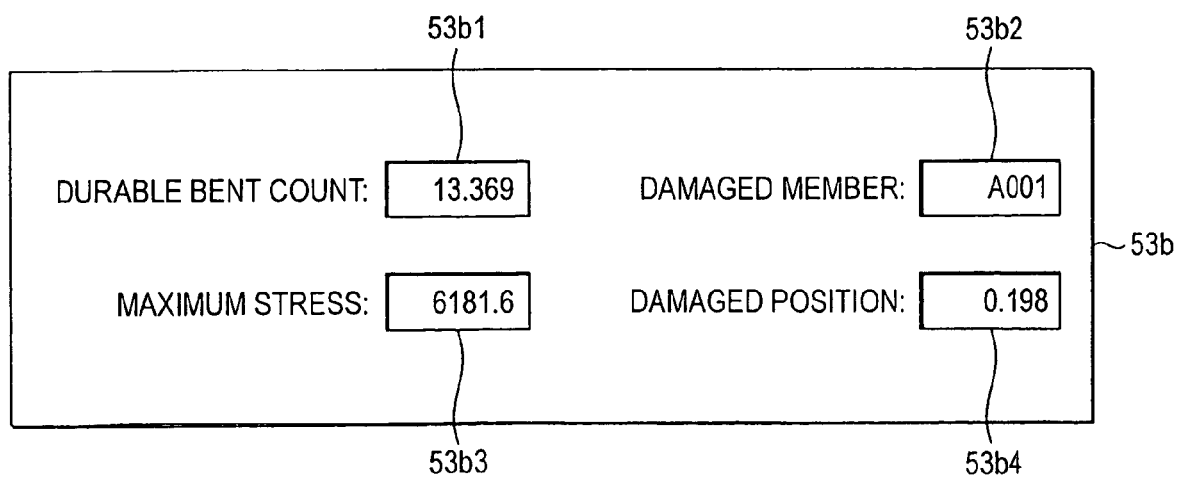
FIG. 10 is a diagram showing an output screen according to the embodiment of the invention.

The processing according to the embodiment of the invention will now be described while referring to flowcharts in FIGS. 6 and 7, and explanatory diagrams shown in FIGS. 8 to 10. FIG. 6 is a flowchart showing the main processing for this embodiment, and FIG. 7 is a flowchart showing the stress calculation processing in FIG. 6. FIG. 8 is a diagram showing an input screen according to the embodiment; FIG. 9 is a diagram for explaining the relationship between the diameter of the electric wire 1 and the stress; and FIG. 10 is a diagram showing an output screen according to the embodiment.

As shown in FIG. 6, at step S1 data required for prediction are designated. That is, at the least, the start point and the end point for bending, an electric wire type, and the atmosphere temperature are designated. To designate these data, the input screen shown in FIG. 8 is displayed on the display device 53, and necessary values are entered to this input screen by using the input device 52. Since there are a plurality of numbers and types of electric wires to be protected by a single grommet, each electric wire is repetitively entered using the input screen. The input screen is not limited to the example shown in FIG. 8.

The start point and the end point of the bending movement correspond to the initial shapes and the final bent shapes of the electric wires and the grommet, respectively. Although not shown, the bent shapes of the electric wires and the grommet at the start point and the end point may be graphically displayed on the input screen. While watching this display, the start point and the end point can be appropriately adjusted to accurately designate the initial shapes and the final bent shapes. The bent shapes of the electric wires and the grommet at the individual points can be computed in advance.

The method used for designating the initial shapes and the final bent shapes of the electric wires and the grommet is not limited to the above setup method, and the bent shapes of the electric wires and the grommet presented on the display device 53 may be appropriately adjusted, using a mouse, to match the initial shapes and the final bent shapes. The computed stresses in from the initial shapes to the final bent shape is the degree of the change in the stress from that in the initial shape. Since this stress change is equal to the absolute value of the stress under the assumption that the stress on the initial shape is zero. In the following explanation, the stress change is regarded as a stress.

The electric wire type is the type of each electric wire for which the product life should be predicted. Each electric wire type is designated in correlation with the characteristics of the shape and the material. For example, shape characteristics are information on the lengths and the cross-sectional sizes of the electric wire and the grommet, and material characteristics are a secondary moment, a secondary polar moment, a density, a vertical elastic modulus coefficient and a horizontal elastic modulus coefficient. The information can be obtained in advance through testing.

The atmosphere temperatures are the temperatures in the atmosphere surrounding the electric wires and the grommet for which the product lives are predicted, and a plurality of typical values, such as −40° C., 0° C. and 25° C., are employed. It is assumed that the coordinate data concerning the attachment positions of the electric wires and the grommet have previously been designated on another setup screen (not shown). Further, assume that a default step width according to which the initial shape is changed to the final bent shape is designated in advance, and can also be designated on another setup screen (not shown) The process at step S1 corresponds to the setup step and the setup unit in the claims.

At step S2, the electric wires are laid. That is, the thickest one of all the designated electric wires is selected and arranged innermost at the bend. A further explanation for this process will be given while referring to FIG. 9. As shown in FIG. 9, a linearly extended electric wire (actually a wire cover) 1a is to be bent at the bending radius R, as is indicated by an arrow.

When the distortion of the electric wire 1a is denoted by ε, $$\epsilon = \Delta L/L \qquad (1)$$

$$L = 2\pi R_2 \qquad (2)$$

$$\Delta L = 2\pi R_1 - 2\pi R_2 \qquad (3)$$

where L denotes the length of the center line of the electric wire 1a, ΔL denotes the length the electric wire 1a is stretched, $R_1$ denotes the outer bending radius of the electric wire 1a, and $R_2$ denotes the bending radius for the center of the electric wire 1a.

By referring to equations (1) to (3), the distortion ε of the electric wire 1a can be represented as $$\begin{aligned}\varepsilon &= (2\pi R_1 - 2\pi R_2)/2\pi R_2 \\ &= R_1/R_2 - 1 \\ &= (R+d)/(R+d/2) - 1\end{aligned} \qquad (4)$$

where R denotes the bending radius of the electric wire, and d denotes the diameter of the electric wire.

When the stress for the electric wire 1a is denoted by σ, the stress σ can be represented as $$\sigma = E_\epsilon \qquad (5)$$

It is apparent from equations (4) and (5) that the stress a is increased as the diameter d of the electric wire 1a becomes large.

Therefore, according to the invention, since the thickest electric wire is arranged innermost as possible at the bend, the accuracy of the life prediction is increased, while a more rigorous bending path is assumed. More specifically, when a plurality of electric wires in the grommet are bent into an L shape, the thickest electric wire need only be arranged so it is the innermost at the bend because there is only one bent portion. However, when a plurality of electric wires in the grommet are bent into a Z shape, it is preferable that thinner electric wires be arranged in the center of a wire harness or a grommet, and that the thickest and the second thickest electric wires be arranged on the outside, while taking into account the fact that the innermost portion at a specific bend becomes the outermost portion at another bend. It should be noted that in either case the thickest electric wire is arranged innermost at the bend (when there are a plurality of bends, the thickest wire is arranged at one of these bends).

With this arrangement, since the bending durability prediction is performed for a more rigorous bending path, the shortest bending durable period can be accurately predicted. For the selection and the arrangement of the thickest electric wire, the automatic process can be performed in which the diameters of the electric wires designated at step S1 are compared, and the electric wire having the largest diameter is selected and is placed in contact with the internal wall on the bending side of the grommet. The input device 52 may be employed to manually select and arrange the thickest electric wire. The process at step S2 corresponds to the electric wire arrangement step in the claims.

When this process is completed, at steps S3 and S4, infinite element models are prepared for the electric wires and the grommet. As described above, a plurality of rectangular infinite elements are employed as the infinite element models for the grommet, and three-dimensional beam elements are employed as the infinite element models for each electric wire. The processes at steps S3 and S4 correspond to the infinite element model preparation step and the infinite element model preparation unit in the claims.

At step S5, the stresses are calculated for the individual infinite elements. That is, in the stress calculation process, as shown in FIG. 7, at step S501 the stress is calculated at four points for each infinite element of the grommet, as shown in FIG. 3A. At step S502, as shown in FIG. 3B, the stress is calculated at four points in a cross section area of each electric wire. At step S503, the obtained stresses are entered in the result file 55b in correlation with the position (infinite element) information and the time information. At step S504, the electric wires and the grommet are bent to the next shape by bending them the distance defined by the change step width. The processes at steps S501 to S504 are repeated until the bent shapes correspond to the final shapes designated at step S1 (N at step S505). When the shapes correspond to the final bent shapes, program control returns to step S6 (Y at step S505). Steps S5 and S501 to S505 correspond to the stress calculation step and the stress calculation unit in the claims.

Next, at step S6, in the plurality of stresses that are obtained and entered in the result file 55b at step S5, the maximum stresses are found for the electric wires and the grommet. Step S6 corresponds to the maximum stress search step in the claims.

At step S7, the prediction functions are read for the electric wires and the grommet designated at step S1. That is, since the life data file 55a is stored in the storage device 55, the prediction function for the electric wire or the grommet to be examined is read from this file 55a. Naturally, at this time, the prediction function corresponding to the atmosphere temperature designated at step S1 is also read. Step S7 corresponds to the prediction function acquisition step and the prediction function reading unit in the claims.

Following this, at step S8, while referring to the prediction functions read at step S7, the numbers of bendings that are durable are obtained that correspond to the maximum stresses found for the electric wires and the grommet at step S6. Further, the smallest number of bending is obtained. As is described above, the smallest number of bendings for endurance can be predicted from only one bending movement. Step S8 corresponds to the predicting step and the predicting unit in the claims.

Then, at step S9, a position on the electric wire or the grommet is specified that corresponds to the smallest number of bendings for endurance obtained at step S8. More specifically, since the infinite element corresponding to the smallest number of bendings for endurance can be specified, a position on a corresponding electric wire or grommet can also be identified by referring to the result file 55a. Step S9 corresponds to the specifying step and the specifying unit in the claims.

At step S10, the smallest number of bendings for endurance, and the electric wire or grommet identified at step S9 and the position thereof are displayed on the display device 53. As shown in FIG. 10, the smallest number of bendings for endurance, the maximum stress, the damaged member and the damaged position are shown on this output screen. Further, although not shown in FIG. 10, the damaged member and the damaged position may together be graphically displayed on the output screen. In addition, the stresses for infinite elements other than the damaged portion may be displayed using different colors. Therefore, a more exact improvement proposal can be provided. Naturally, members other than the damaged member may be graphically displayed along with the stresses that are displayed using different colors. Step S10 corresponds to the output step and the output unit in the claims.

When, at step S11, it is ascertained that an instruction has been issued to output the result file 55b, at step S12, the contents of the result file 55b are output in a text form. This result file 55b may be displayed on the display device 53, or may be printed on paper by the printing device 54. Further, the contents to be output may be designated by using the input device 52. When the output of the result file 55b is not required, the process sequence may be terminated (N at step S11).

As another embodiment, instead of the prediction functions, the stress tables may be referred to prepare a prediction for the bending durabilities of a plurality of electric wires and a grommet. In this case, at step S7, the stress tables are read in consonance with a plurality of electric wires, a grommet and an atmosphere temperature that are designated at step S1 (corresponds to the stress table reading step in the claims). At step S9, these stress tables and the maximum stresses that are searched for at step S6 for the electric wires and the grommet are referred to, and the electric wire or the grommet that is first damaged is specified (corresponding to a damaged member specifying step in the claims). At step S10, the name of the electric wire or the grommet that is first damaged is output. Through this processing, the portion to be improved can be easily identified, and this can be usefully employed to reduce the development period. This embodiment corresponds to claim 3.

As an additional embodiment, the prediction functions that correspond to the electric wires and the grommet, each of which represent the relationship among the atmosphere temperature, the stress and the number of bendings for endurance and/or the stress tables that show the maximum stresses according to which it is assumed that the electric wires and the grommet will be damaged, may be referred to, and the smallest number of bendings for endurance, for the electric wire or the grommet and/or the damage specifying information for the electric wire or the grommet that is first damaged, may be output. Therefore, according to this embodiment, a bending durability prediction method can be provided that can satisfy the demand for accurate life prediction and a reduction in the development period. This embodiment corresponds to claim 4.

As a further embodiment, when the durability of a wire harness is to be predicted in the above described manner, data concerning a vehicle body may be entered along with the shape data for the wire harness, because the reason the portion has the shortest product life can be easily traced. For example, when the wire harness interferes with the vehicle body, a strong stress tends to be concentrated at a part of the wire harness that corresponds to the interference portion. When data for the vehicle body is entered in advance, it can be easily determined that interference between the wire harness and the vehicle body causes the product life of the interference portion to be shortest. That is, when the durability prediction is performed by using the input data for the vehicle body, the interference of the wire harness with the vehicle body can also be examined.

As is described above, according to the embodiments of the invention, a bending durability prediction method can be provided that can satisfy the demand for more accurate prediction and for a reduction in the development period. Further, since the bending durability prediction is performed for a more rigorous bending path, the shortest bending durability can be accurately predicted. In addition, since statistically a stricter condition is employed for the bending durability prediction, the bending durability prediction can be more strictly performed, and this contributes a greater quality improvement and a proposal for an improved path.

The present invention is not limited to these embodiments. The bending is not limited to the hinge of the door, and the scope of the present invention is not limited to the inside of the automobile. Further, the shape of the grommet is not limited to that in the embodiment.

According to the invention, a plurality of electric wires and the bend protection member that are attached at a predetermined bend, the atmosphere temperature, the initial shapes and the final bent shapes are designated, and the infinite element models for the bend protection member and the electric wires are prepared. Further, the stresses are calculated that are imposed on the infinite elements while being bent and moving from the initial shapes to the final bent shapes, and from these stresses, the maximum stresses for the electric wires and the bend protection member are searched for. Then, the numbers of bendings that are durable, which correspond to the maximum stresses imposed on the electric wires and the bend protection member, are obtained while referring to necessary prediction functions, and the smallest number of bendings for endurance is identified and output. In addition, the position on the electric wire or the bend protection member corresponding to the durability for the smallest number of bendings may also be output. Therefore, the overall bend durability for the electric wires, including the bend protection member, can be predicted. Further, a corresponding position can also be predicted. As a result, the demand for an accurate life prediction and a reduction in the development period can be satisfied.

According to the invention, instead of the prediction functions, reference is made to the stress tables, which represent the minimum stresses according to which it is assumed that the electric wires and the bend protection members will be damaged. Then, damage specifying information is output for the electric wires or the bend protection member that is first damaged. As a result, the portion to be improved can be easily identified, and this helps to reduce the development period.

According to the invention, reference is made to the prediction functions, which correspond to the plurality of electric wires and the bend protection member and that each represent a relationship between the atmosphere temperature, the stress and the durability of the number of bendings, and/or reference is made to the stress tables, which represent the minimum stresses according to which it is assumed that the electric wires and the bend protection member will be damaged. Then, the durability for the smallest number of bendings @@@for the electric wires or the bend protection member, and/or the information specifying the electric wire or the bend protection member that is first damaged is output. As a result, a bending durability prediction method can be provided that satisfies the demand for accurate life prediction and a reduction in the development period.

According to the invention, as the prediction functions, curves are employed to represent the lower confidence interval of the modular regression function that is statistically obtained based on data, which have been obtained under a plurality of typical atmosphere temperatures, for the stresses and the numbers of bendings that are durable for the bend protection member and the electric wires. Therefore, the product life prediction is performed under statistically more rigid conditions. Naturally, predetermined statistical confidence can be maintained for the prediction functions, and the calculation of these prediction functions is also simple. As a result, the bending durability prediction is more strictly performed without complicated procedures being added, and this can contribute to a greater improvement in the quality and to a proposal for a better path.

According to the invention, the thickest electric wire of all is arranged so as to be the innermost wire at the bend, and the infinite element models for the bend protection member and the plurality of electric wires are prepared. Therefore, since the bend durability prediction is performed along a more rigorous bend path, the shortest bend durability can be more accurately predicted. As a result, a more accurate bending durability prediction method can be provided.

The invention claimed is:

1. A bending durability prediction method of predicting a bending durability of a plurality of wires laid at a predetermined bend, and of a bend protection member attached at the bend to protect the plurality of wires, by using an infinite element method, the bending durability prediction method comprising:
   a setup step of setting up the plurality of wires, the bend protection member, an atmosphere temperature, pre-bending initial shapes for the wires and the bend protection member and final bent shapes for the wires and the bend protection member;
   an infinite element model preparation step of preparing infinite element models for the plurality of wires and the bend protection member;
   a stress calculation step of calculating stress, for each of infinite elements of the infinite element models, produced by bending the infinite elements from the initial shape to the final bent shape;
   a maximum stress search step of searching, among the stresses obtained at the stress calculation step, for the maximum stress for each of the plurality of wires and the bend protection member;
   a prediction function acquisition step of obtaining prediction functions for the wires and the bend protection member at the atmosphere temperature setup at the setup step;
   a predicting step of referring to the prediction functions obtained at the prediction function acquisition step, obtaining numbers of bendings for endurance which correspond to the maximum stresses for the wires and the bend protection member, and identifying the smallest number of bendings for endurance; and
   an output step of outputting the smallest number of bendings obtained at the predicting step.

2. The bending durability prediction method according to claim 1 further comprising:
   a specifying step of specifying a position on the wires or the bend protection member corresponding to the smallest number of bendings for endurance,
   wherein the position specified at the specifying step is output at the output step.

3. The bending durability prediction method according to claim 1, wherein as the prediction function, a curve is employed that represents a lower confidence interval relative to a modular regression function that is statistically obtained based on data on the stresses and the number of bendings for endurance which are acquired under a plurality of typical atmosphere temperatures.

4. The bend durability prediction method according to claim 1, further comprising:
   a wire arrangement step of arranging, innermost at the bend, a thickest wire of all the plurality of wires.

5. The bend durability prediction method according to claim 1, further comprising:
   a storing step of previously storing stress tables which represent minimum stresses according to which it is assumed that the plurality of wires and the bend protection member will be damaged;
   a stress table reading step of reading stress tables corresponding to the plurality of wires, the bend protection member and the atmosphere temperature designated in the setup step; and
   a damaged member specifying step of specifying the wire or the bend protection member that is first damaged, while referring to the stress tables that are read at the stress table reading step and the individual maximum stresses that are found at the maximum stress search step for the wires and the bend protection member,
   the output step outputs information specifying the wire or the bend protection member that is first damaged.

6. A bending durability prediction method of predicting a bending durability of a plurality of wires laid at a predetermined bend, and of a bend protection member attached at the bend to protect the plurality of wires by using an infinite element method, the bending durability prediction method comprising:
   a storing step of previously storing stress tables which represent minimum stresses according to which it is assumed that the plurality of wires and the bend protection member will be damaged;
   a setup step of setting up the plurality of wires, the bend protection member, an atmosphere temperature, pre-bending initial shapes for the wires and the bend protection member and final bent shapes for the wires and the bend protection member;
   an infinite element model preparation step of preparing infinite element models for the plurality of wires and the bend protection member;
   a stress calculation step of calculating stress, for each of infinite elements of the infinite element models, produced by bending the infinite elements from the initial shape to the final bent shape;
   a maximum stress search step of searching, among the stresses obtained at the stress calculation step, for the maximum stress for each of the plurality of wires and the bend protection member;
   a stress table reading step of reading stress tables corresponding to the plurality of wires, the bend protection member and the atmosphere temperature designated in the setup step;
   a damaged member specifying step of specifying the wire or the bend protection member that is first damaged, while referring to the stress tables that are read at the stress table reading step and the individual maximum stresses that are found at the maximum stress search step for the wires and the bend protection member; and
   an output step of outputting information specifying the wire or the bend protection member that is first damaged.

7. The bend durability prediction method according to claim 6, further comprising:
a wire arrangement step of arranging, innermost at the bend, a thickest wire of all the plurality of wires.

8. A bending durability prediction apparatus for predicting a bending durability of a plurality of wires laid at a predetermined bend, and of a bend protection member attached at the bend to protect the plurality of wires by using an infinite element method, the apparatus comprising:
a setup unit for setting up the plurality of wires, the bend protection member, an atmosphere temperature, pre-bending initial shapes for the wires and the bend protection member and final bent shapes for the wires and the bend protection member; an infinite element model preparation unit for preparing infinite element models for the plurality of wires and the bend protection member;
a stress calculation unit for calculating stress, for each of infinite elements of the infinite element models, produced by bending the infinite elements from the initial shape to the final bent shape;
a maximum stress search unit for searching, among the stresses obtained by the stress calculation unit, for the maximum stress for each of the plurality of wires and the bend protection member;
a prediction function acquisition unit for obtaining prediction functions for the wires, the bend protection member and the atmosphere temperature designated by the setup unit;
a predicting unit for referring to the prediction functions obtained by the prediction function acquisition unit, obtaining numbers of bendings for endurance which correspond to the maximum stresses for the wires and the bend protection member, and identifying the smallest number of bendings for endurance; and
an output unit for outputting the smallest number of bendings obtained by the predicting unit.

9. A computer readable recording medium storing a program for predicting a bending durability of a plurality of wires laid at a predetermined bend, and of a bend protection member attached at the bend to protect the plurality of wires by using an infinite element method, the program causing a computer to function as:
a setup unit for setting up the plurality of wires, the bend protection member, an atmosphere temperature, pre-bending initial shapes for the wires and the bend protection member and final bent shapes for the wires and the bend protection member;
an infinite element model preparation unit for preparing infinite element models for the plurality of wires and the bend protection member;
a stress calculation unit for calculating stress, for each of infinite elements of the infinite element models, produced by bending the infinite elements from the initial shape to the final bent shape;
a maximum stress search unit for searching, among the stresses obtained by the stress calculation unit, for the maximum stress for each of the plurality of wires and the bend protection member;
a prediction function acquisition unit for obtaining prediction functions for the wires, the bend protection member and the atmosphere temperature designated by the setup unit;
a predicting unit for referring to the prediction functions obtained by the prediction function acquisition unit, obtaining numbers of bendings for endurance which correspond to the maximum stresses for the wires and the bend protection member, and identifying the smallest number of bendings for endurance; and
an output unit for outputting the smallest number of bendings obtained by the predicting unit.

10. A bending durability prediction method comprising:
preparing infinite element models for materials;
calculating stress, for each infinite element of the infinite element models, produced by bending the infinite elements from an initial shape to a final bent shape;
searching, among the calculated stresses, for maximum stress for each of the materials;
obtaining a prediction function for the materials;
obtaining numbers of bendings which correspond to the maximum stresses for the materials;
identifying the smallest number of bendings producing failure; and
outputting the smallest number of bendings identified.

11. The bending durability prediction method of claim 10, wherein the materials comprise a plurality of wires.

12. The bending durability prediction method of claim 11, wherein the materials further comprise a bend protection member.

13. The bending durability prediction method of claim 12, further comprising setting an atmosphere temperature.

14. The bend durability prediction method of claim 11, further comprising arranging the plurality of wires in a bundle such that a thickest wire is the center wire of the bundle.

15. The bending durability prediction method of claim 10 further comprising:
specifying a position on the materials corresponding to a smallest number of bendings producing failure; and
outputting the position specified.

16. The bending durability prediction method of claim 10, wherein the prediction function employs a curve that represents a lower confidence interval relative to a modular regression function that is statistically obtained based on:
data regarding stresses; and
a number of bendings producing failure acquired under a plurality of typical atmosphere temperatures.

17. The bend durability prediction method of claim 10, further comprising:
storing stress tables which represent minimum stresses at which the materials will be damaged;
reading the stress tables;
specifying a material that is damaged first by using the stress tables and the maximum stresses for the materials; and
outputting information specifying the material that is damaged first.

18. The bending durability prediction method of claim 17, wherein the materials comprise a plurality of wires.

19. The bending durability prediction method of claim 18, wherein the materials further comprise a bend protection member.

* * * * *